United States Patent
Daniels et al.

(10) Patent No.: US 7,503,275 B2
(45) Date of Patent: Mar. 17, 2009

(54) SYSTEM FOR ATTACHING A FLEXIBLE ENCLOSURE TO A BOAT WINDSHIELD FRAME

(75) Inventors: Brian K. Daniels, Bradenton, FL (US); Stuart A. Tyson, Bradenton, FL (US)

(73) Assignee: Ameritex Technologies, Inc., Bradenton, FL (US)

( * ) Notice: Subject to any disclaimer, the term of this patent is extended or adjusted under 35 U.S.C. 154(b) by 113 days.

(21) Appl. No.: 11/241,193

(22) Filed: Sep. 30, 2005

(65) Prior Publication Data

US 2007/0074648 A1      Apr. 5, 2007

(51) Int. Cl.
*B63B 17/00* (2006.01)

(52) U.S. Cl. .................... 114/361; 114/343
(58) Field of Classification Search ............ 114/343, 114/361
See application file for complete search history.

(56) References Cited

U.S. PATENT DOCUMENTS

| | | | |
|---|---|---|---|
| 2,937,652 A | 5/1960 | Zimmer et al. | |
| 2,961,725 A | 11/1960 | McGee | |
| 3,093,845 A | 6/1963 | Brock et al. | |
| 3,172,419 A | 3/1965 | Lewis | |
| 3,304,657 A | 2/1967 | Singleton | |
| 4,815,410 A * | 3/1989 | Muhlberger | ............ 114/361 |
| 4,951,594 A | 8/1990 | Feikema | |
| 4,993,351 A | 2/1991 | Zirkelbach et al. | |
| 5,044,131 A | 9/1991 | Fisher | |
| D324,368 S | 3/1992 | Zirkelbach et al. | |
| 5,189,980 A | 3/1993 | Zirkelbach et al. | |
| 5,215,032 A | 6/1993 | Ellis et al. | |
| 5,339,763 A | 8/1994 | Erskine | |
| 5,367,977 A | 11/1994 | Ellis et al. | |
| 5,425,327 A | 6/1995 | Zirkelbach et al. | |
| 5,622,136 A | 4/1997 | Zirkelbach et al. | |
| 5,706,753 A | 1/1998 | Menne et al. | |
| 5,839,388 A | 11/1998 | Vadney | |
| 5,970,904 A | 10/1999 | Wellen et al. | |
| 6,026,761 A | 2/2000 | Parniske et al. | |
| 6,453,841 B1 | 9/2002 | Shearer et al. | |
| 6,886,489 B2 | 5/2005 | Zarn et al. | |
| 2002/0069812 A1 | 6/2002 | Biedenweg | |
| 2002/0184842 A1 * | 12/2002 | Norman | ............ 52/204.53 |

* cited by examiner

*Primary Examiner*—Jesus Sotelo
*Assistant Examiner*—Daniel V. Venne
(74) *Attorney, Agent, or Firm*—Barnes & Thornburg LLP

(57) ABSTRACT

An attachment system for attaching a flexible enclosure to a boat windshield frame includes a frame trim piece with a longitudinally and transversely extending groove retaining a resilient insert. The insert has a pair of legs extending from one end of a shank and touching to conceal the groove. A screw snap stud can be inserted at any selected position along the groove to self-tap into the walls of the groove and releasably retain a cooperating fastener on the flexible enclosure. If the stud is removed, the insert legs return to the original position. Alternatively, the insert is not used or the insert does not include the legs.

23 Claims, 6 Drawing Sheets

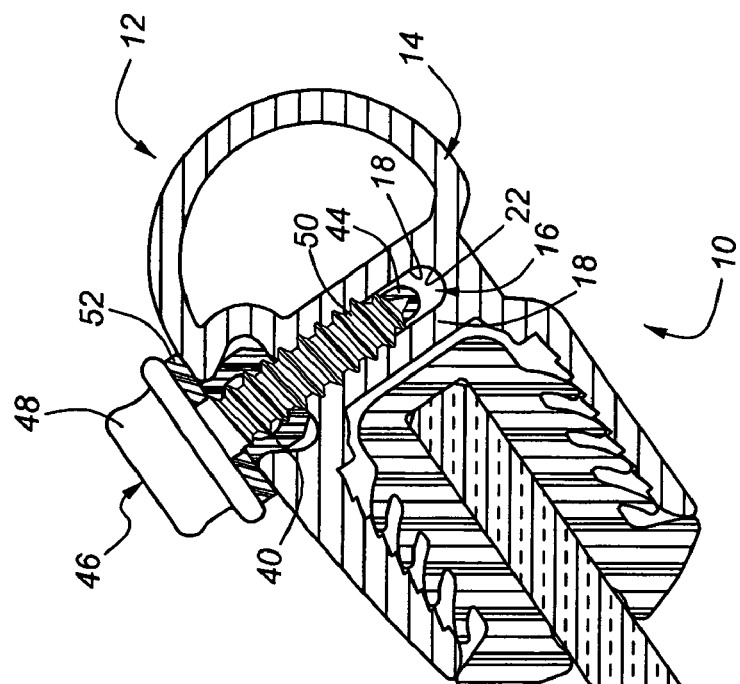
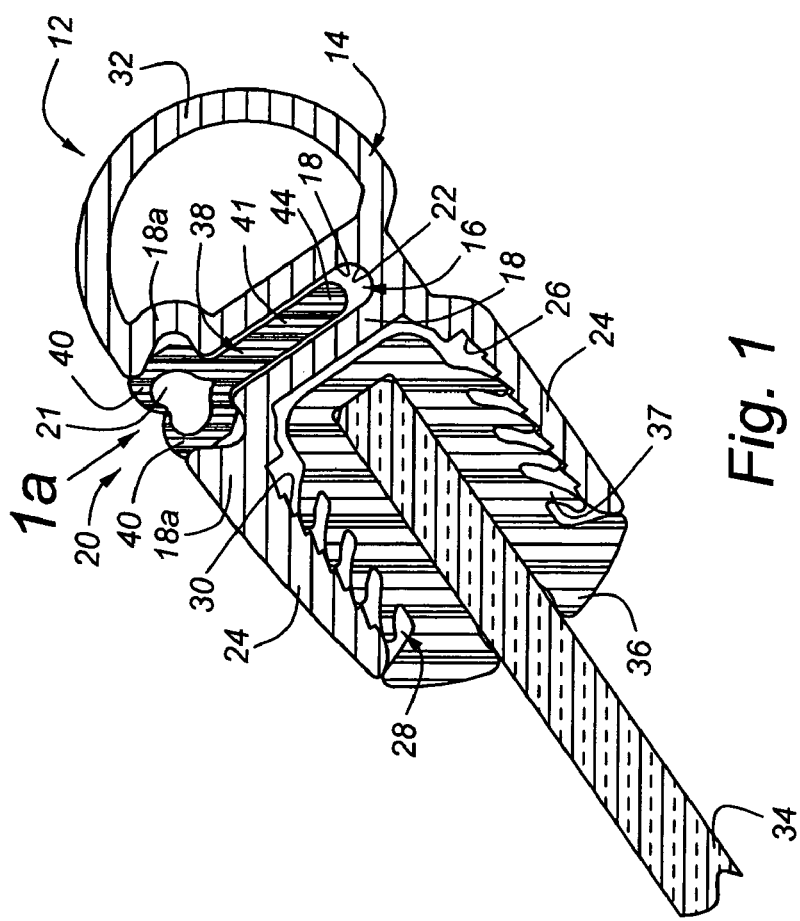

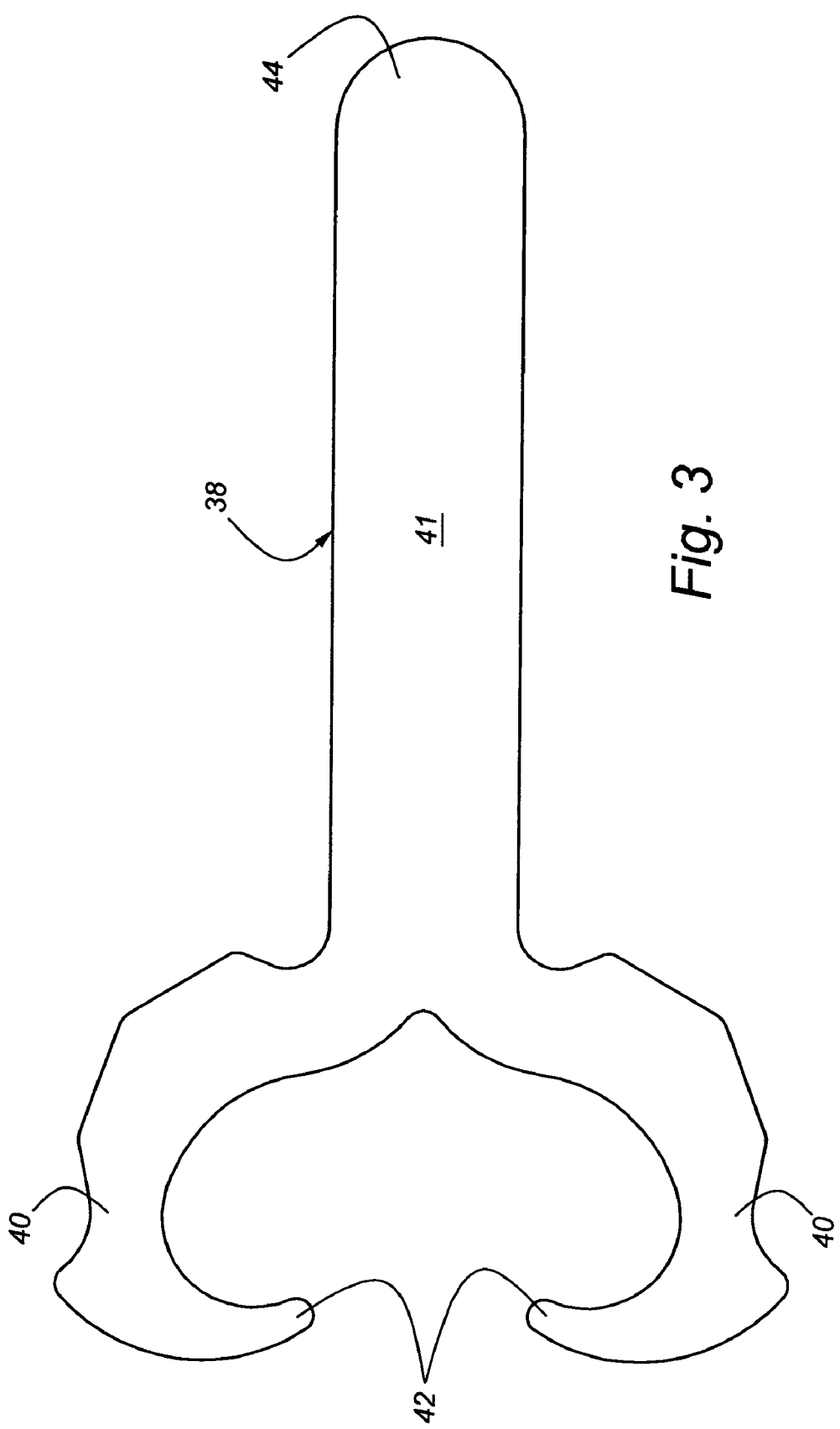

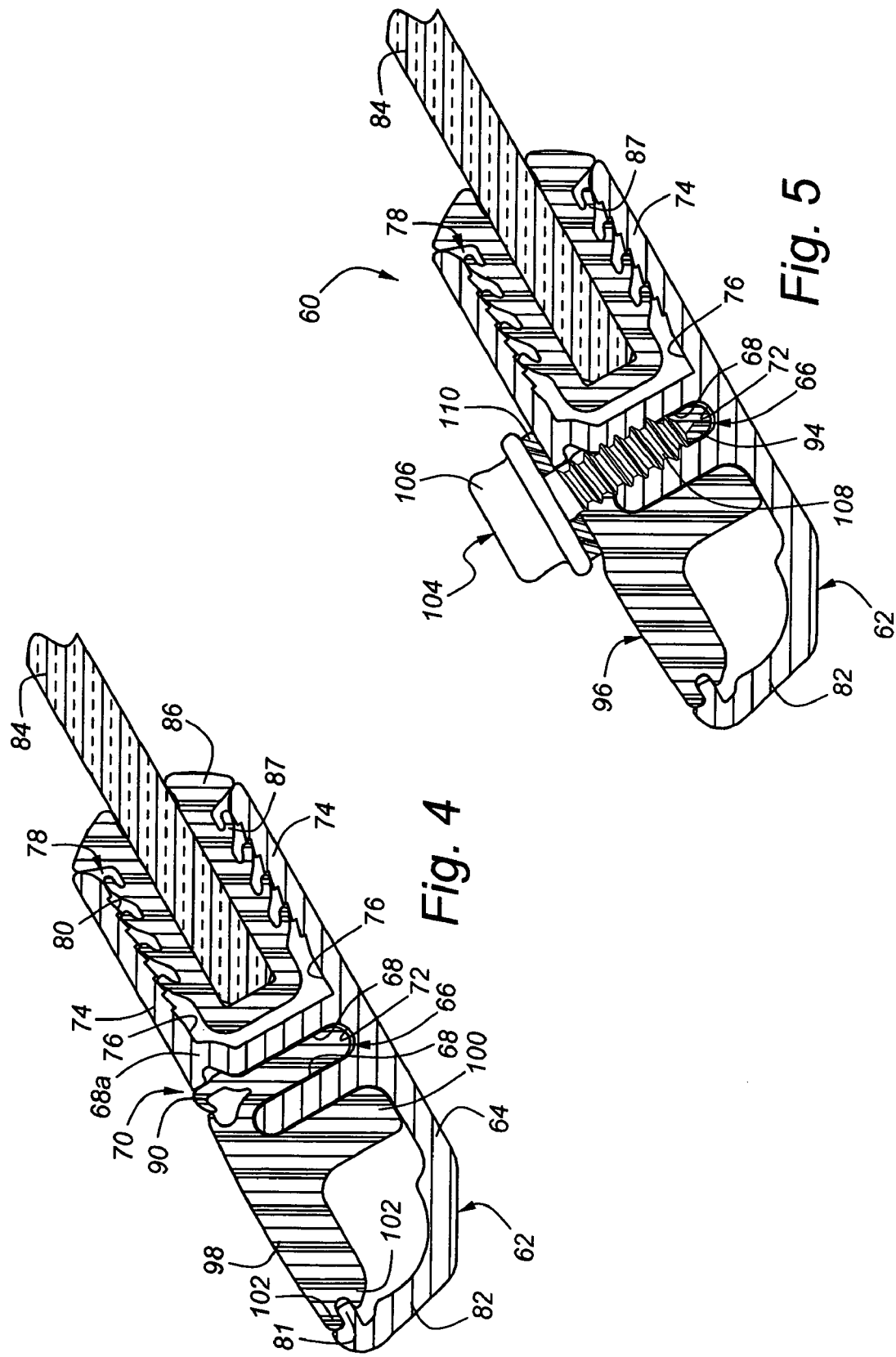

SYSTEM FOR ATTACHING A FLEXIBLE ENCLOSURE TO A BOAT WINDSHIELD FRAME

BACKGROUND OF THE INVENTION

The present invention relates generally to boat windshields and, in particular to an attachment system for attaching a flexible enclosure to a boat windshield frame.

Most pleasure boats today have flexible enclosures, such as canvas covers, for the cockpit. These flexible enclosures usually fasten in part to the windshield frame with the use of snaps.

There are conventional methods of attaching snap fasteners to a boat windshield. The most common prior art method is to utilize a windshield clip, which is a generally rectangular stainless steel clip with a male snap head attached to the center. These clips are formed in standard sizes for securing to the outer face of the windshield frame extrusion. In most cases they hook over one edge of the extrusion glass channel and clip into a groove or recess along the outer face of the extrusion. There are a number of drawbacks to this design. Windshield clips can slide out of position once they are installed, which can scratch the finish on the windshield frame, and require repositioning of the clip to reinstall the canvas enclosure. In addition, the relatively large size of these clips detracts from the clean aesthetic look of the windshield frame.

Another prior art method of attaching snaps to the windshield is to drill holes in the windshield frame and install rivet snaps or screw snap studs. This is a very time consuming process. Great care must be taken while drilling to avoid slipping and scratching the frame. Placement of the holes is critical as not to break the glass during installation. Once a snap is installed, it can not be relocated without leaving a hole in the frame. This can make installing the canvas very difficult.

Yet another prior art method is to utilize a plastic expansion anchor that inserts into a groove or recess in the frame. A screw snap stud is then installed into the expansion anchor which tightens against the inside of the recess. These fasteners tend to loosen up over time and can slide out of position, which disadvantageously requires the boat owner to reposition the snap in order to re-install the canvas enclosure. In addition, installation is somewhat tedious due to multiple components of the fastener. Dirt and debris or salt water can collect in the extrusion recess and promote corrosion.

It is desirable, therefore, to provide an improved system for attaching a flexible enclosure to a boat windshield frame.

SUMMARY OF THE INVENTION

The present invention concerns an attachment system for attaching a flexible enclosure to a boat windshield frame having a windshield trim piece with an elongated body and a groove formed therein. The groove has a pair of spaced walls extending generally parallel to a longitudinal axis of the trim piece and extending transverse to the longitudinal axis between a wider opening and an opposed bottom wall of the groove. An elongated insert formed of a resilient material and in profile having a shank with a pair of legs extending from one end thereof is retained in the groove with free ends of the legs touching to conceal the groove at the groove opening. A screw snap stud having a head formed as a snap fastener and a threaded shank is inserted between the free ends at any selected position along the insert and into the groove by self-tapping the insert shank and the groove walls.

The trim piece body has a pair of spaced legs for retaining the edge of the windshield including a seal member. When the trim piece is a bottom trim piece, it has a foot extending from a lower one of the groove walls and the pair of spaced legs extends from an upper one of the groove walls. The foot and the groove lower wall form an open area and the insert includes a downwardly extending portion closing the open area.

DESCRIPTION OF THE DRAWINGS

The above, as well as other, advantages of the present invention will become readily apparent to those skilled in the art from the following detailed description of a preferred embodiment when considered in the light of the accompanying drawings in which:

FIG. 1 is a cross-sectional view of an insert portion of an attachment system for attaching a flexible enclosure to a boat windshield frame upper trim piece in accordance with the present invention;

FIG. 2 is a cross-sectional view of the attachment system of FIG. 1 with a snap portion installed;

FIG. 3 is an end view of the insert shown in FIG. 1;

FIG. 4 is a cross-sectional view of an insert portion of an attachment system for attaching a flexible enclosure to a boat windshield frame bottom trim piece in accordance with the present invention;

FIG. 5 is a cross-sectional view of the attachment system of FIG. 4 with a snap portion installed;

DESCRIPTION OF THE PREFERRED EMBODIMENT

Figure 1A:
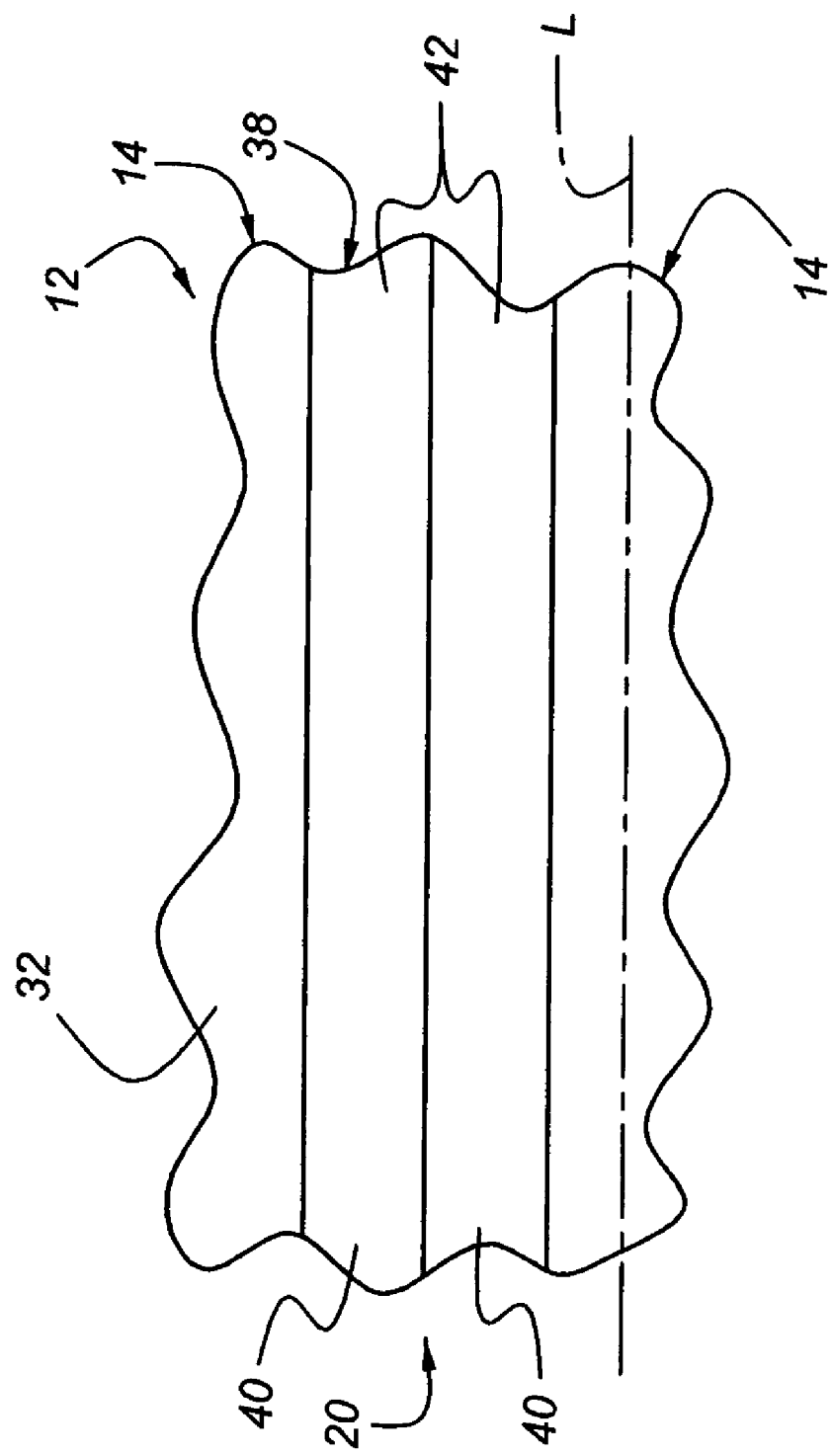
FIG. 1a is an enlarged fragmentary front elevation view in the direction of arrow 1a of the insert portion in FIG. 1.

Referring now to FIGS. 1 through 3, there is shown a system 10 for attaching a flexible enclosure (not shown) to an upper edge of a boat windshield frame. The flexible enclosure may be, but is not limited to, a canvas top or the like. The system 10 includes a boat windshield upper or header trim piece 12 having an elongated body 14 with a laterally (depth) and longitudinally (length) extending groove 16 formed therein. The groove 16 is defined by opposing upper and lower walls 18 of the body 14 and extends generally parallel to a longitudinal axis L (FIG. 1a) of the header trim 12. The walls 18 of the groove 16 extend from a wider opening 20 to a closed end wall 22 opposed to the opening 20. The opening 20 is at a surface of the body 14 facing away or outwardly from a cockpit of a boat when the upper trim piece 12 is installed on a windshield. A forward end 18a of each of the walls 18 is bowed outwardly to form a cavity 21 connected to the opening 20.

The body 14 is preferably an extrusion formed from aluminum or similar material having a high material strength and low weight, but those skilled in the art will appreciate that the body 14 may be formed from a variety of materials by a variety of manufacturing methods while remaining within the scope of the present invention. Similarly, the length of the body 14 and the length of the groove 16 may be chosen to fit a variety of requirements and, therefore, may be advantageously varied according to those requirements while remaining within the scope of the present invention.

A pair of spaced apart legs 24 extends downwardly from a lower one of the groove walls 18 and the legs have inner walls 26 that define a space or cavity 28 therebetween. The inner walls 26 have a plurality of serrations 30 formed thereon. A rounded cap 32 extends upwardly from an upper one of the walls 18 to provide a smooth surface upon which the flexible enclosure rests when attached as described below. A windshield upper edge portion 34 has a U-shaped seal member 36 attached thereto. The upper edge 34 and the seal member 36 are received in the space 28 between the legs 24. The seal member 36 includes a plurality of projections 37 extending outwardly from each leg that engage with the serrations 30 on the walls 26 to aid in retaining the upper trim piece 12 on the windshield.

As shown in FIG. 3, an elongated generally Y-shaped insert member 38 includes in profile a pair of legs 40 attached at one end of an elongated shank 41. The legs 40 are generally C-shaped with free outer ends 42 and an opposite end 44 of the shank 41 is rounded. The insert 38 is preferably formed of a resilient material including, but not limited to, vinyl or the like. The insert 38 is adapted to be installed shank 41 first through the opening 20 into the groove 16 of the body 14, best seen in FIG. 1. When installed in the groove 16, the opposite end 44 of the insert 38 is adjacent the end wall 22 and the opening 20 and the forward portions 18a are sized to force the free ends 42 of the legs 40 into contact. In this position, also shown in FIG. 1a, the legs 40 of the insert 38 advantageously conceal the groove 16, provide a clean aesthetic look and also prevent dirt, debris, and water from collecting in the groove 16.

The upper trim piece 12 and the insert member 38 shown in FIGS. 1 and 1a form an insert portion of the system 10 shown in FIG. 2.

Best seen in FIG. 2, a screw snap stud 46 includes a head portion 48 formed as a snap fastener and a threaded shank portion 50 extending from the head portion 48. The screw snap stud 46 is adapted to be removably installed between the free ends 42 of the insert member 38. The screw snap stud 46 is preferably formed of a metallic material such as stainless steel, aluminum, galvanized steel or similar type material that has both high material strength and corrosion resistance properties. The material strength of the screw snap stud 46 is greater than the material strength of the body 14 to enable self-tapping of the screw snap stud 46 into the material of the body 14, discussed in more detail below. A washer 52 is disposed between a lower surface of the head portion 48 of the screw snap stud 46 and an exterior surface of the body 14 surrounding the opening 20. The washer 52 is preferably formed of a material such as, but not limited to, nylon or the like. The washer 52 functions to protect the finish on the exterior surface of the body 14 from the head portion 48 of the screw snap stud 46 and militate against loosening rotation of the stud due to vibrations generated during operation of a boat with a motor.

In FIG. 2, the screw snap stud 46 is shown installed in the groove 16 in a selected position along the length of the frame 12. When the stud 46 is installed, the higher strength material of the stud 46 allows the stud 46 to self-tap through the shank portion 41 of the insert member 38 and into the lower strength material of the walls 18 of the groove 16, fixedly securing the stud 46 to the body 14, and thereby providing a firm support to which the flexible enclosure may be attached. Preferably, one of a plurality of the screw snap studs 46 is installed at each associated selected position along the longitudinal length of the upper trim piece 12 to match a position of a corresponding female snap member (not shown) that is attached to the flexible enclosure and engages with the head portion 48 of the stud 46. If the screw snap stud 46 is removed from the groove 16, for example to replace or reposition it, the resilient material of the insert 38 relaxes and the free ends 42 of the legs 40 move back to the position shown in FIGS. 1 and 1a advantageously concealing the previously installed position.

Figure 6:
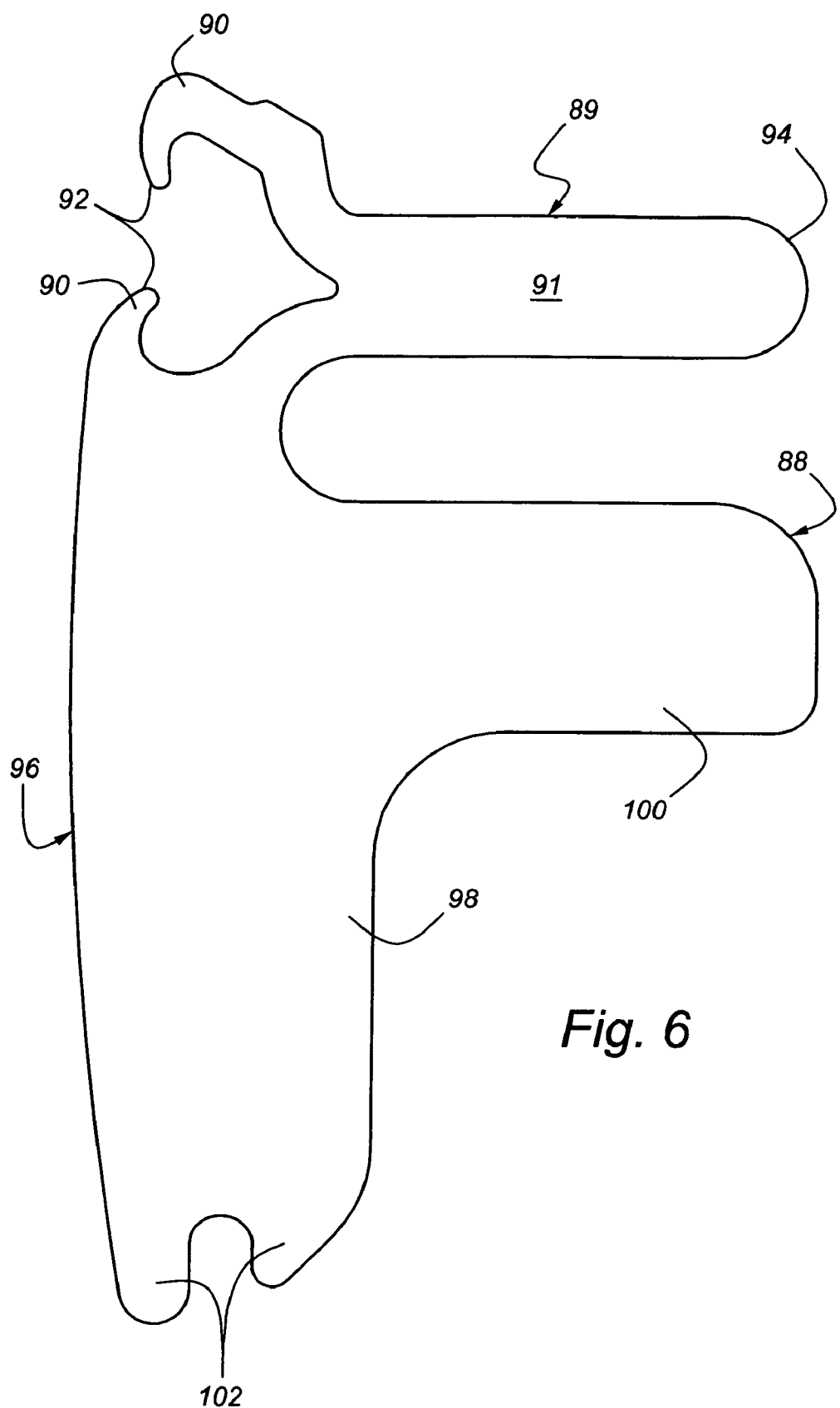
FIG. 6 is an end view of the insert shown in FIG. 4.

Referring now to FIGS. 4 through 6, there is shown an alternative embodiment system 60 for attaching a flexible enclosure to a lower edge of a boat windshield frame. The flexible enclosure may be, but is not limited to, a canvas cover or the like that extends over the upper trim piece and covers the windshield down to a bottom trim piece 62. The system 60 includes the bottom trim piece 62 having an elongated body 64 with a laterally and longitudinally extending groove 66 formed therein. The groove 66 is defined by opposing walls 68 of the body 64 and extends generally parallel to a longitudinal axis (not shown) of the bottom trim piece 62. An upper wall 68 of the groove 66 extends between a wider exterior facing opening 70 and an end wall 72 opposite the opening 70. An outwardly bowed forward portion 68a of the upper wall 68 is adjacent the opening 70. The lower wall 68 terminates at the point at which the forward portion 68a of the upper wall 68 starts.

The body 64 is preferably formed from extruded aluminum or similar material having a high material strength and low weight, but those skilled in the art will appreciate that the body 64 may be formed from a variety of materials in a variety of manufacturing methods while remaining within the scope of the present invention. Similarly, the length of the body 64 and the length of the groove 66 may be chosen to fit a variety of requirements and may be advantageously varied while remaining within the scope of the present invention.

A pair of spaced apart legs 74 extends upwardly from the upper one of the walls 68 and has inner walls 76 that define a space 78 therebetween. A cap or foot 82 extends downwardly from a lower one of the walls 68 being formed of a plurality of longer flat sections joined at angles. The cap or foot 82 terminates in a flange 81 that extends toward the lower one of the walls 68. The respective interior walls 76 of the legs 74 preferably include a plurality of serrations 80 formed thereon. A windshield lower edge portion 84 has a U-shaped seal member 86 attached thereto and both are received in the space 78 between the legs 74. The seal member 86 includes a plurality of projections 87 extending outwardly from legs that engage with the serrations 80 on the walls 76 to aid in retaining the windshield 84 and the seal member 86 in the space 78 of the body 64.

As shown in FIG. 6, an elongated insert member 88 includes in profile a generally Y-shaped or first portion 89, similar to the insert 38 of FIGS. 1-3, having a pair of legs 90 and a shank 91. The legs 90 are attached to and extend from one end of the shank 91. The legs 90 are generally C-shaped with spaced apart free ends 92. The shank 91 has an opposite end 94 that is rounded. The insert 88 is preferably formed of a resilient material including, but not limited to, vinyl or the like. The first portion 89 of the insert 88 is adapted to be installed in the groove 66 through the opening 70 of the body 64, best seen in FIG. 4, such that the opposite end 94 is positioned adjacent the end wall 72 of the groove. An upper one of the legs 90 is deformed downwardly by the forward portion 68a such that the free ends 92 are forced together in the opening 70 in a manner similar to the insert 38 shown in FIG. 1a. In this position, the legs 90 of the insert 88 advantageously conceal the groove 66, provide a clean aesthetic look and also prevent dirt, debris, and water from collecting in the groove 66.

The insert member 88 also includes a generally L-shaped second portion 96 extending downwardly from the Y-shaped first portion 89. The second portion 96 includes a downwardly extending leg 98 and an inwardly extending leg 100 parallel to and spaced from the shank 91. The downwardly extending leg 98 includes a pair of flanges 102 on a free end thereof. The second portion 96 of the insert 88 is adapted to be installed in the open area defined by the cap or foot 82 and the lower one of the walls 68 of the groove 66. The leg 100 abuts the lower one of the walls 68 and the flanges 102 of the leg 98 receive the flange 81 of the header 82, best seen in FIG. 4. When installed in the bottom trim piece 62, the insert member 88 advantageously conceals the open area defined by the lower one of the walls 68 and the foot 82 eliminating the requirement for a separate closure piece, providing a clean aesthetic look and also preventing dirt, debris, and water from collecting.

As shown in FIG. 5, a screw snap stud 104, similar to the screw snap stud 46 of FIG. 3, includes a head portion 106 formed as a snap fastener and a threaded shank portion 108 extending from the head portion 106. The screw snap stud 104 is adapted to be removably installed between the free ends 92 of the legs 90. The stud 104 is preferably formed of a metallic material such as stainless steel, aluminum, galvanized steel or similar type material that has both high material strength and corrosion resistance properties. The material strength of the screw snap stud 104 is greater than the material strength of the body 64 to enable self-tapping of the screw snap stud 104 into the material of the body 64, discussed in more detail below. A washer member 110 is disposed between a lower surface of the head portion 106 of the stud 104 and an exterior surface of the body 64. The washer 110 is preferably formed of a resilient material such as, but not limited to, nylon or the like, and functions in a manner similar to the washer 52.

In FIG. 5, the screw snap stud 104 is shown installed in the groove 66 in a selected installed position along the length of the bottom trim piece 62. When stud 104 is installed, the higher strength material of the stud 104 allows the stud 104 to self-tap through the shank 91 of the insert member 88 and into the lower strength material of the walls 68 of the groove 66, fixedly securing the stud 104 to the bottom trim piece 62, and thereby providing a firm support to which the flexible enclosure may be attached. Preferably, a plurality of the screw snap studs 104 are installed at selected positions along the longitudinal length of the bottom trim piece 62 corresponding to female snap members (not shown) on the flexible enclosure that engage with the respective head portions 106 of the screw snap studs 104. If one of the screw snap studs 104 is removed from the groove 66, the resilient material of the first portion 89 of the insert member 88 relaxes to the original position shown in FIG. 4, advantageously concealing the installation position.

The system 10 and the system 60 may be combined with a single windshield to provide attachment options for the boat owner.

While shown in the above-described configurations, those skilled in the art will appreciate that many profiles and configurations of the inserts 38 and 88, the upper trim piece 12 and the bottom trim piece 62 may be utilized while remaining within the scope of the present invention. In addition, while vinyl has been described in the embodiments shown, any resilient material having properties as described above may be used to form the inserts 38 and 88.

Figure 7:
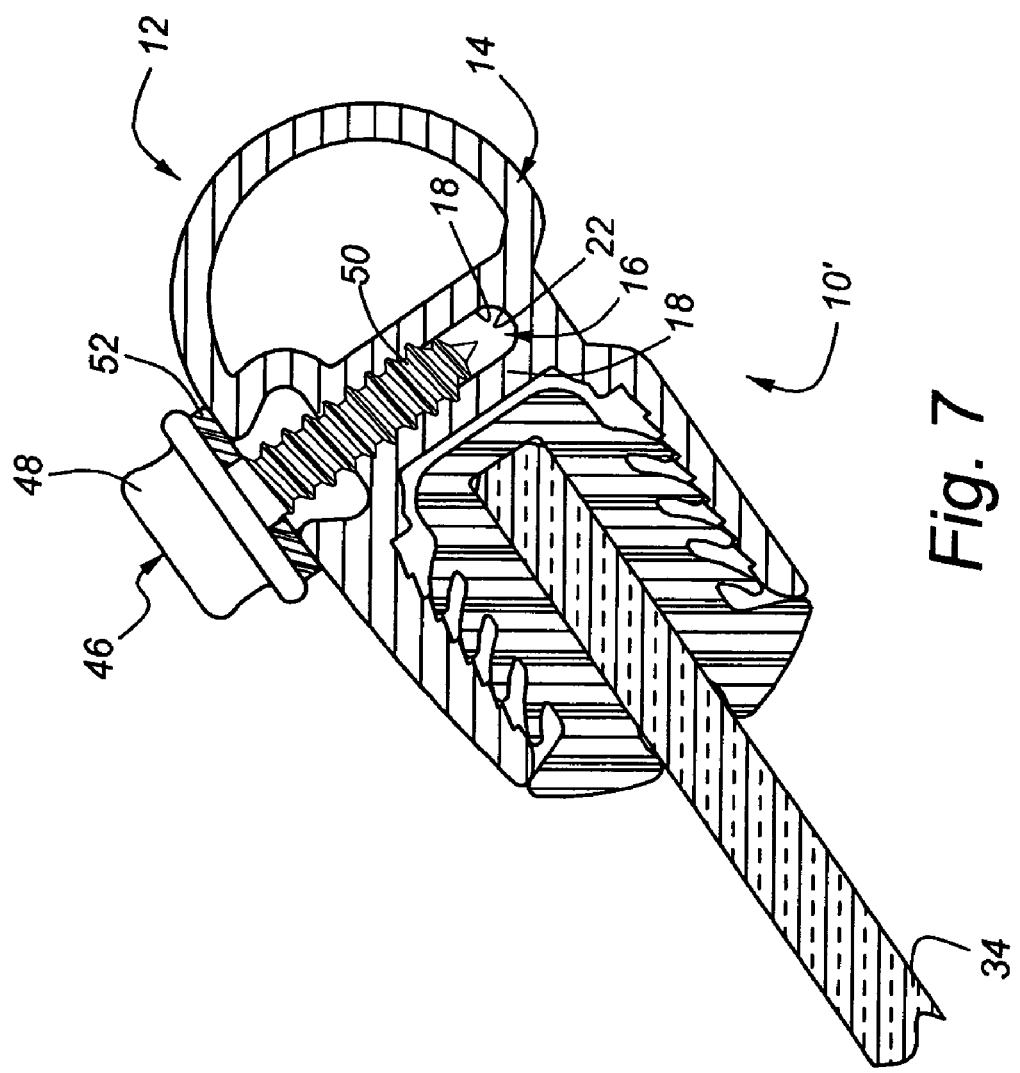
FIG. 7 is a cross-sectional view of an alternative embodiment of an attachment system for attaching a flexible enclosure to a boat windshield frame upper trim piece in accordance with the present invention.

Referring now to FIG. 7, there is shown an alternative embodiment of a system 10' for attaching a flexible enclosure (not shown) to an upper edge of a boat windshield frame. The system 10' includes the boat windshield upper or header trim piece 12 shown in FIG. 1 having the elongated body 14 with the laterally (depth) and longitudinally (length) extending groove 16 formed therein.

The system 10' does not include an insert, such as the insert member 38 shown in FIGS. 1-3, that is received in the opening 20. In the system 10', when a fastener, such as the screw stud 46, is inserted in the opening 20, the stud 46 self-taps directly into the walls 18 of the groove 16, fixedly securing the fastener to the body 14, and thereby providing a firm support to which the flexible enclosure may be attached. The stud 46 may be advantageously removed from the groove 16 and reinstalled at a different position along the length of the groove 16, where the stud 46 will again self-tap into the walls 18 of the groove 16. The system 10' may be advantageous in installations wherein the insert member 38 is eliminated to reduce cost, or where it is not desirable or advantageous to conceal the previously installed position of the stud 46. Similarly, an alternative embodiment of the system 60 (not shown) does not include the insert 96 and, when the stud 104 is inserted in the opening 70, the stud 104 self-taps directly into the walls 68 of the groove 66, fixedly securing the stud 104 to the body 64, and thereby providing a firm support to which the flexible enclosure may be attached.

In some cases, the insert member 38 and/or the insert member 88 do not require the legs 40 and 90 respectively. The shaft 41, 91 simply extends to a single one of the free ends 42, 92 and the material is resilient enough to conceal the entry point of the screw snap stud after it has been removed.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A boat windshield frame, comprising:
   a boat windshield trim piece having an elongated body with a groove formed therein, said groove having a pair of spaced walls extending generally parallel to a longitudinal axis of said trim piece and extending transverse to said longitudinal axis between an opening and an opposed bottom wall of said groove, wherein said walls of said groove extend from a wider opening at the forward end of said walls to a closed end wall opposed to said opening and said forward end of at least one of said walls is bowed outwardly to form a cavity connected to said opening; and
   an elongated insert formed of a resilient material and, in profile, having a shank with a pair of legs extending from one end thereof, said shank being retained in said groove with free ends of said legs concealing said groove at said groove opening.

2. The boat windshield frame according to claim 1 further comprising a screw snap stud having a head formed as a snap fastener and a threaded shank, said threaded shank being sized to engage said groove walls, said threaded shank extending into said groove, said threaded shank being releasably retained in said groove by self-tapping said groove walls and said insert shank, said threaded shank extending between said free ends at a selected position along said insert, and when said screw snap stud is removed from said groove, said free ends concealing said selected position.

3. The boat windshield frame according to claim 2 wherein, when said screw snap stud is removed from said groove, said free ends of said insert touch one another, thereby concealing the selected position.

4. The boat windshield frame according to claim 1 wherein said resilient material is a vinyl material.

5. The boat windshield frame according to claim 1 wherein said insert legs are generally C-shaped.

6. The boat windshield frame according to claim 1 wherein said bowed wall of said opening is adjacent to one of said legs.

7. The boat windshield frame according to claim 1 wherein said trim piece is a bottom trim piece having a foot extending from a lower one of said groove walls and a pair of spaced legs extending from an upper one of said groove walls for retaining a lower edge of a boat windshield.

8. The boat windshield frame according to claim 7 wherein said foot and said groove lower wall form an open area and said insert includes a downwardly extending portion closing said open area.

9. The boat windshield frame according to claim 7 wherein said foot and said lower groove wall form an open area, said insert includes a downwardly extending first leg engaging said foot and a second leg engaging said groove lower wall, and said first and second legs close said open area.

10. The boat windshield frame according to claim 7 wherein said foot and said lower groove wall form an open area, said foot has an upwardly extending flange, said insert includes a downwardly extending leg having at least one flange engaging said upwardly extending flange, and said downwardly extending leg closes said open area.

11. The boat windshield frame according to claim 1 wherein said insert extends along at least a substantial portion of said groove.

12. The boat windshield frame according to claim 1 wherein said insert shank has a rounded end portion.

13. The boat windshield frame according to claim 1 wherein said trim piece is an upper trim piece having a curved cap extending across an upper one of said groove walls and a pair of spaced legs extending from a lower one of said groove walls for retaining an upper edge of a boat windshield.

14. The boat windshield frame according to claim 13, wherein said forward ends of both of said walls are bowed outwardly.

15. An boat windshield frame for attaching a flexible enclosure to a boat windshield frame, comprising:
a boat windshield trim piece having an elongated body with a groove formed therein, said groove having a pair of spaced walls extending generally parallel to a longitudinal axis of said trim piece and extending transverse to said longitudinal axis between an opening and an opposed bottom wall of said groove;
an elongated and solidly formed insert of a resilient material and in profile having a solid shank with a pair of legs extending from one end thereof, said shank being retained in said groove with free ends of said legs touching to conceal said groove at said groove opening, and
a plurality of screw snap studs each having a head formed as a snap fastener and a threaded shank, each said threaded shank being inserted between said free ends at a selected position along said insert and into said groove by self-tapping said insert shank and said groove walls.

16. The boat windshield frame according to claim 15 wherein said resilient material is a vinyl material.

17. The boat windshield frame according to claim 15 wherein said insert legs are generally C-shaped.

18. The boat windshield frame according to claim 15 wherein said insert shank has a rounded end portion.

19. The boat windshield frame according to claim 15 wherein said trim piece is an upper trim piece having a curved cap extending across an upper one of said groove walls and a pair of spaced legs extending from a lower one of said groove walls for retaining an upper edge of a boat windshield.

20. The boat windshield frame according to claim 15 wherein said trim piece is a bottom trim piece having a foot extending from a lower one of said groove walls and a pair of spaced legs extending from an upper one of said groove walls for retaining a lower edge of a boat windshield.

21. The boat windshield frame according to claim 15 wherein said foot and said groove lower wall form an open area and said insert includes a downwardly extending portion closing said open area.

22. The attachment system according to claim 15 wherein said trim piece is a bottom trim piece having a foot extending from a lower one of said groove walls and a pair of spaced legs extending from an upper one of said groove walls for retaining a lower edge of a boat windshield, said foot and said groove lower wall forming an open area and said insert including a downwardly extending portion closing said open area.

23. An attachment system for attaching a flexible enclosure to a boat windshield frame, comprising:
a boat windshield trim piece having an elongated body with a groove formed therein, said groove having a pair of spaced walls extending generally parallel to a longitudinal axis of said trim piece and extending transverse to said longitudinal axis between an opening and an opposed end wall of said groove, at least one of said walls having a bowed portion at said opening;
an elongated generally Y-shaped insert formed of a resilient material and in profile having a shank forming the base of the Y-shape with a pair of legs extending from one end thereof, said shank being retained in said groove with free ends of said legs touching to conceal said groove at said groove opening, an adjacent one of said legs contacting said bowed portion; and
a plurality of screw snap studs each having a head formed as a snap fastener and a threaded shank, each said threaded shank being inserted between said free ends at a selected position along said insert and into said groove by self-tapping said insert shank and said groove walls.

* * * * *